United States Patent [19]

Fisher et al.

[11] Patent Number: 4,730,447

[45] Date of Patent: Mar. 15, 1988

[54] APPARATUS FOR TURNING A WINDROW OF CROP MATERIAL

[75] Inventors: Jacob M. Fisher, Gordonville; Ivan L. Stoltzfus, New Holland, both of Pa.

[73] Assignee: New Holland Inc., New Holland, Pa.

[21] Appl. No.: 751,099

[22] Filed: Jul. 2, 1985

Related U.S. Application Data

[63] Continuation-in-part of Ser. No. 639,192, Aug. 9, 1984, abandoned.

[51] Int. Cl.⁴ .................... A01D 78/00; A01D 78/10
[52] U.S. Cl. .................................. 56/377; 56/372; 56/376; 56/366; 56/DIG. 21
[58] Field of Search ................. 56/DIG. 2, DIG. 21, 56/365, 366, 368, 370, 372, 376, 377

[56] References Cited

U.S. PATENT DOCUMENTS

| | | | |
|---|---|---|---|
| 2,390,375 | 12/1945 | Kucera | 56/370 |
| 2,391,427 | 12/1945 | Kucera | 56/370 |
| 2,636,335 | 4/1953 | Whitney | 56/370 |
| 2,761,270 | 9/1956 | Blaser et al. | 56/DIG. 21 |
| 3,496,713 | 2/1970 | Reinhardt et al. | 56/370 |
| 3,570,231 | 3/1971 | McCary et al. | 56/370 |
| 3,702,052 | 11/1972 | Klassen | 56/370 |
| 4,471,605 | 9/1984 | Ender | 56/372 |

FOREIGN PATENT DOCUMENTS 69059 1/1983 European Pat. Off. ............. 56/370

Primary Examiner—John Weiss
Attorney, Agent, or Firm—Larry W. Miller; Frank A. Seemar; Darrell F. Marquette

[57] ABSTRACT

An apparatus for laterally displacing and inverting a windrow of crop material is disclosed wherein a pickup engages a windrow of crop material along a first path and elevates the windrow into a table where it is conveyed in a semi-circular path by a horizontal conveyor until it is rolled off a discharge edge of the table into a second path laterally displaced from the first path. The speed relationship between the horizontal conveyor and the forward movement of the apparatus is such that the elevated windrow of crop material is gently rolled off the discharge edge of the platform in such a manner that the windrow is inverted when it engages the ground. A method of laterally displacing and inverting a windrow of crop material is also disclosed wherein the windrow is gently picked up, conveyed and turned upside down without the need for a structural device to engage the windrow and positively invert it. This method of turning a windrow of crop material results in a laterally displaced windrow that has been fluffed to more efficiently facilitate the drying thereof.

10 Claims, 13 Drawing Figures

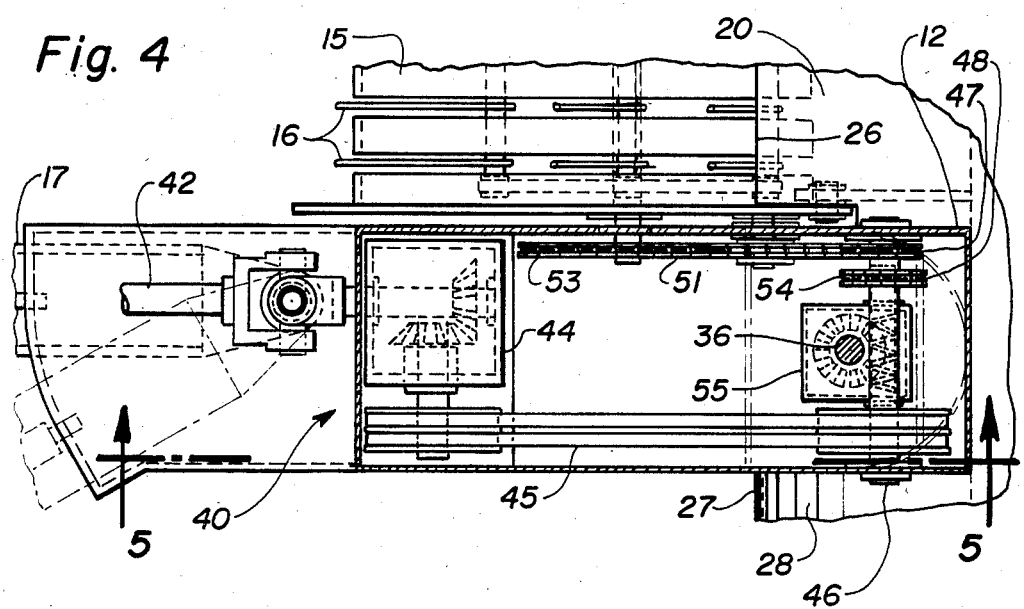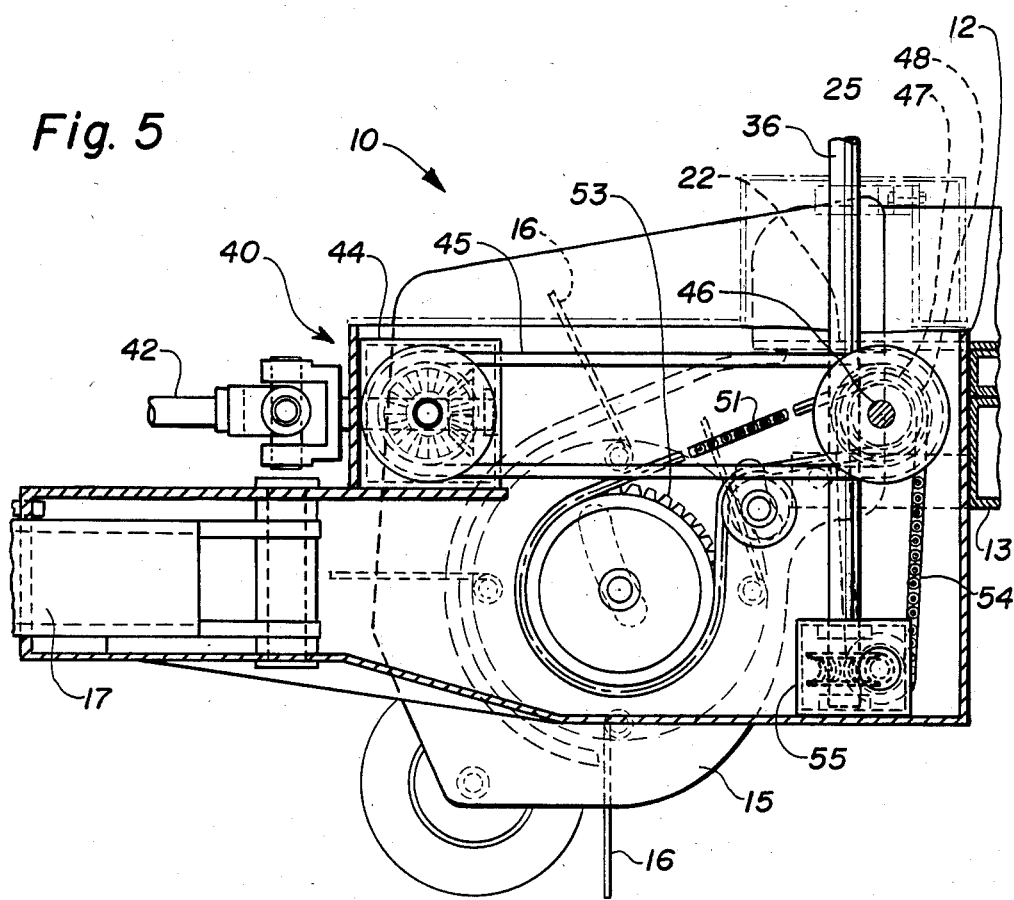

APPARATUS FOR TURNING A WINDROW OF CROP MATERIAL

CROSS REFERENCE TO RELATED APPLICATIONS

This application is a continuation-in-part of U.S. patent application Ser. No. 639,192, filed Aug. 9, 1984, and abandoned Sept. 19, 1985.

BACKGROUND OF THE INVENTION

The present invention relates generally to farm machinery and, more particularly, to a method and apparatus for moving and inverting windrows of crop material so as to maximize the nutritional value thereof, as well as minimize the time necessary for drying the windrow.

At present and in the past, many different types of machines have been used for moving and/or turning over swaths or windrows of crop material, such as hay. While such machines have generally served the purpose, they have been subject to one or more of the following disadvantages:

1. They have been complicated in construction and thus difficult and expensive to manufacture;
2. They have been difficult to operate and/or repair;
3. They have turned over the windrow of crop material but have not moved it from the original windrow position, thereby placing the turned over hay on the damp surface underneath the original windrow;
4. They have treated the crop material roughly and, therefore, have caused the crop material to break up, thereby lessening its nutritional value; and/or
5. They have not been effective in picking up the crop material or turning the crop material upside down.

Accordingly, a need has arisen for a simple and effective apparatus for laterally moving and turning over swaths and/or windrows of crop material.

SUMMARY OF THE INVENTION

It is an object of this invention to overcome the aforementioned disadvantages of the prior art by providing a method and apparatus for gently turning over and fluffing a windrow of crop material.

It is another object of this invention to provide an apparatus for laterally moving and inverting a windrow of crop material without the need to utilize a structural device to positively invert the windrow.

It is a feature of this invention that the windrow turner utilizes a pickup device to gently elevate the windrow of crop material from the ground to a table spaced above the ground.

It is an advantage of this invention that the pickup device for the windrow turner minimizes damage to the windrow of crop material.

It is still another object of this invention to provide a windrow turner that conveys an elevated windrow of crop material along a semi-circular path with a horizontal conveyor to permit the windrow to be laterally displaced.

It is another feature of this invention that the speed of the horizontal conveyor can be limited to minimize damage to the elevated windrow of crop material.

It is another advantage of this invention that the windrow of crop material is laterally displaced from the path along which the pickup device first engage the windrow.

It is still another feature of this invention that the windrow turner is mechanically driven from a source of rotational power serving as a prime mover to permit the rotational speed of the pickup and horizontal conveyor to be selectively varied in relation to the ground speed of the windrow turner.

It is a further object of this invention to provide a method for laterally displacing and turning over a windrow of crop material that results in a fluffed windrow with the dry side adjacent the ground and the damp side exposed to the sun to facilitate drying thereof.

It is still another advantage of this invention that the method of turning a windrow of crop material results in a fluffed windrow to facilitate the passage of air therethrough and, therefore, the drying of the crop material.

It is yet another feature of this invention that the attitude of the windrow is maintained while it is being elevated and laterally displaced to permit an inverting of the windrow upon discharge from the machine.

It is a further advantage of this invention that the windrow turner minimizes the drying time required for a windrow of crop material, while permitting the nutritional value thereof to be maximized.

It is yet a further object of this invention to provide an apparatus for laterally displacing and inverting a windrow of crop material which is durable in construction, inexpensive of manufacture, carefree of maintenance, facile in assemblage and simple and effective in use.

These and other objects, features and advantages are accomplished according to the instant invention by providing an apparatus for laterally displacing and inverting a windrow of crop material wherein a pickup engages a windrow of crop material along a first path and elevates the windrow into a table where it is conveyed in a semi-circular path by a horizontal conveyor until it is rolled off a discharge edge of the table into a second path laterally displaced from the first path. The speed relationship between the horizontal conveyor and the forward movement of the apparatus is such that the elevated windrow of crop material is gently rolled off the discharge edge of the platform in such a manner that the windrow is inverted when it engages the ground. A method of laterally displacing and inverting a windrow of crop material is also disclosed wherein the windrow is gently picked up, conveyed and turned upside down without the need for a structural device to engage the windrow and positively invert it. This method of turning a windrow of crop material results in a laterally displaced windrow that has been fluffed to more efficiently facilitate the drying thereof.

BRIEF DESCRIPTION OF THE DRAWINGS

The advantages of this invention will become apparent upon consideration of the following detailed disclosure of the invention, especially when taken in conjunction with the accompanying drawings wherein:

FIG. 4 is an enlarged cross-sectional view taken along lines 4—4 of FIG. 2 to show the drive mechanism for transferring rotational power from the power input shaft, operatively connected to the power takeoff of the tractor, to the various components;

FIG. 5 is a cross-sectional view taken along lines 5—5 of FIG. 4 to show the drive mechanism;

DETAILED DESCRIPTION OF THE PREFERRED EMBODIMENT

Figure 1:
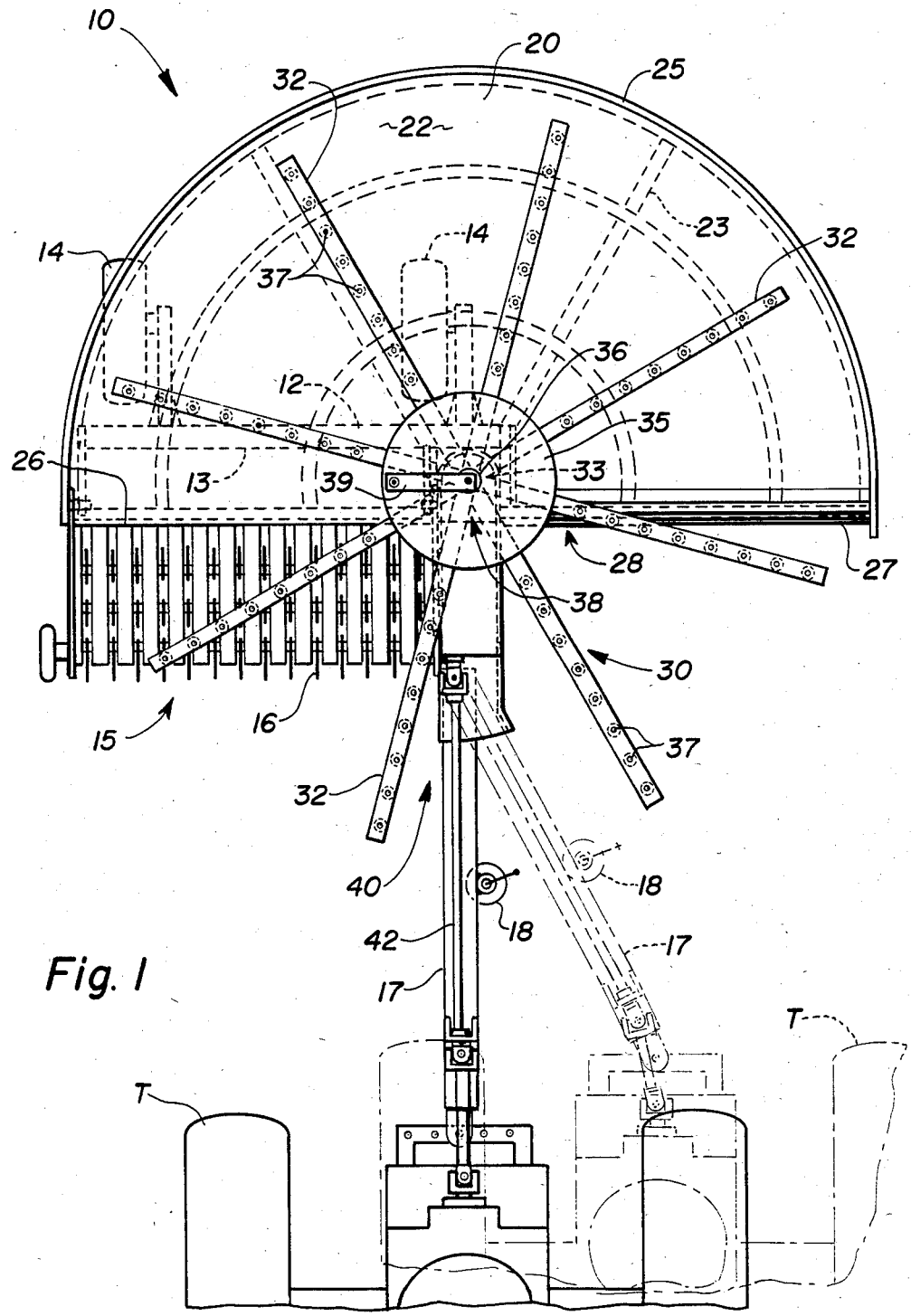
FIG. 1 is a top plan view of the windrow turner incorporating the principles of the instant invention and being connected to a prime mover, such as a tractor, the solid lines of the tongue and tractor showing the transport position of the windrow turner, while the phantom position of the tongue and tractor are utilized to depict an operative position for the windrow turner.

Referring now to the drawings and, particularly to FIG. 1, a top plan view of an apparatus for laterally displacing and inverting a windrow of crop material can be seen. Any left and right references are used as a matter of convenience and are determined by standing at the rear of the machine, facing the forward end, the direction of travel. The windrow turner 10 is provided with a wheeled frame 12 to mobilely support the windrow turner 10 over the ground. The frame 12 includes a transversely extending main beam portion 13 and a pair of ground engaging wheels 14 affixed thereto. A forwardly extending tongue 17 is pivotally connected to the frame 12 and projects forwardly for connection to a prime mover, such as the tractor T. The pivotal movement of the tongue 17 relative to the frame 12 and the tractor T permits the windrow turner 10 to be moved between a transport position, shown in solid lines in FIG. 1, and an operative position, shown in phantom in FIG. 1. A jack 18 is connected to the tongue 17 to support the tongue 17 on the ground when not connected with the tractor T.

Figure 2:
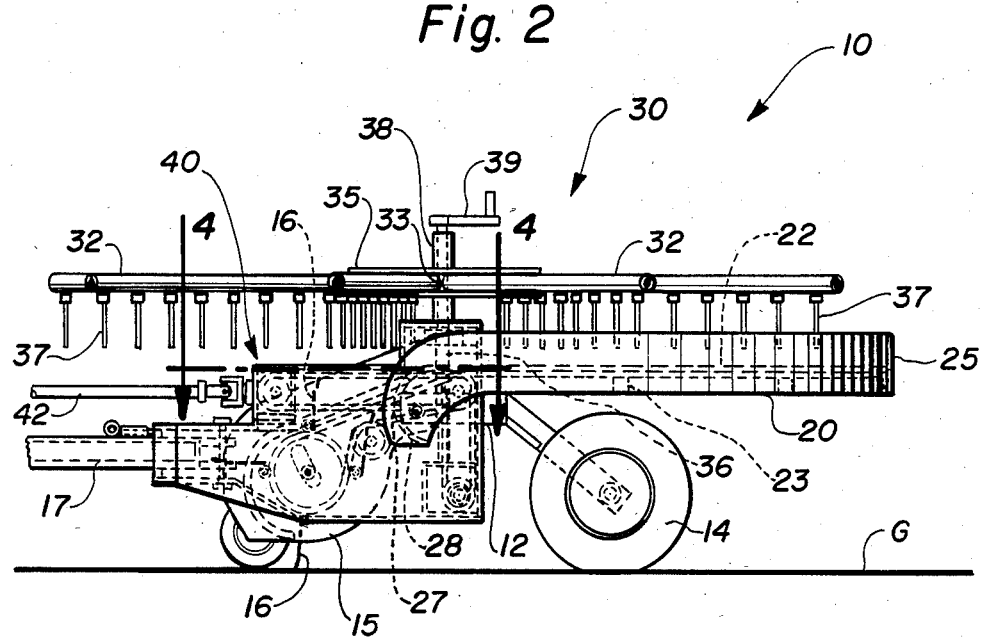
FIG. 2 is a left side elevational view of the windrow turner seen in FIG. 1.
Figure 3:
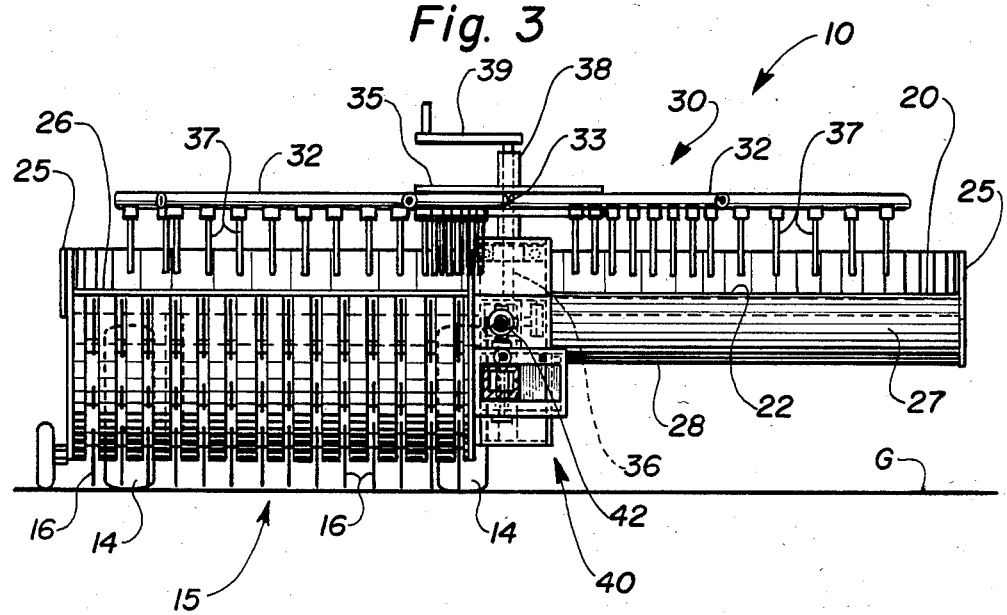
FIG. 3 is a front elevational view of the windrow turner seen in FIG. 1.
Figure 6A:
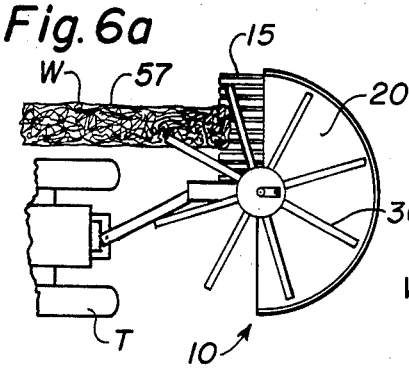
FIGS. 6a, 7a, 8a and 9a are schematic plan views of the windrow turner showing the sequentially operation thereof to pickup a windrow of crop material and then laterally displace, invert, and fluff the windrow.
Figure 6B:
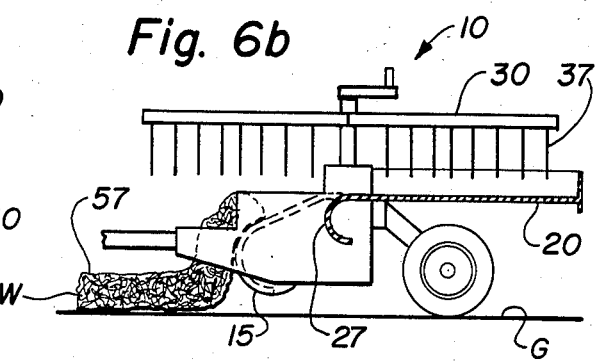
FIGS. 6b, 7b, 8b and 9b are schematic left side elevational views corresponding to FIGS. 6a, 7a, 8a and 9a, respectively.

Referring now to FIGS. 1, 2 and 3, it can be seen that the windrow turner 10 is provided with a pickup mechanism 15, conventionally used on hay balers and having a plurality of rotated tines 16 that engage a swath or windrow of crop material on the ground G and elevate the crop material onto the upper surface 22 of a planar platform or table 20 disposed immediately rearwardly of the pickup 15. The table 20 is semi-circular in shape and is provided with a generally vertical wall 25 extending around the outer periphery of the generally horizontal table 20 at right angles thereto. A sub-frame 23 supports the table 20 and provides for mounting thereof on the main transverse beam 13 of the frame 12. The table 20 begins at an engaging edge 26 adjacent the pickup 15 and terminates in a discharge edge 27 positioned transversely of the pickup 15. The discharge edge 27 is formed with a downwardly curved section 28 to faciliate the inverting of the windrow of crop material, as will be described in further detail below.

Positioned above the table 20 is a rotatable horizontal conveyor 30 operable to engage crop material elevated onto the table 20 by the pickup 15 and convey it in a generally semi-circular path defined by the table 20 for discharge over the discharge edge 27. The horizontal conveyor 30 is constructed of a plurality of radially extending arms 32 connected at their inner ends 33 to a mounting plate 35 mounted to a vertical shaft 36 for rotation therewith. A plurality of downwardly depending tines 37 are mounted on each arm 32 in a radially spaced relationship. The tines 37 engage the crop material on the platform 20 and affect a conveying thereof upon rotation of the vertical shaft 36. A screw type adjustment mechanism 38 is operatively connected to the mounting plate 35 and the vertical shaft 36 to permit an adjustment of the height of the horizontal conveyor 30 relative to the upper surface 22 of the table 20. An appropriate manipulation of the crank arm 39 will affect a corresponding raising or lowering of the arms 32 and, therefore, the tines 37. To adjust the height thereof relative to the table 20.

Referring now to FIGS. 1, 2, 4 and 5, the drive mechanism 40 for operatively powering the pickup 15 and the horizontal conveyor 30 can best be seen. The power input shaft 42 extends forwardly for connection in a conventional manner with the power takeoff shaft (not shown) of the tractor T. The power input shaft 42 delivers rotational power to a first gearbox 44 which transfers rotational power at 90° to a belt drive mechanism 45. The driven shaft 46 of the belt drive mechanism 45 is equipped with a pair of sprockets 47,48 affixed to the shaft 46 and rotatable therewith. A first endless chain 51 entrained around the first sprocket 47 and the drive sprocket 53 for the pickup 15 rotatably drives the pickup 15. A second endless chain 54 is entrained around the second sprocket 48 and delivers rotational power to a speed reduction gearbox 55 to operably drive the vertical shaft 36 at a rotational speed significantly slower than the pickup 15.

In operation, the operator can vary the ground speed of the windrow turner 10 by varying the ground speed of the tractor T while providing a relatively constant rotational speed for the power input shaft 42 from the tractor's power takeoff. However, the operator can also vary the operating speed of the pickup 15 and horizontal conveyor 30 relative to any given ground speed of the machine 10 by varying the output speed of the tractor PTO. The drive mechanism 40 is arranged such that the rotational speed of the power input shaft 42 can be 540 RPM's to affect a rotation of the pickup 15 at approximately 85 RPM's and a rotation of the horizontal conveyor 30 at approximately 10 RPM's. The speed relationship between the horizontal conveyor 30 and the table 20 is somewhat critical in that, because the windrow turner 10 does not incorporate a means for positively inverting the windrow being conveyed by the horizontal conveyor 30. The conveyor 30 must be operable to merely tumble the windrow of crop material over the downwardly curved section 28 at the discharge edge 27. If the horizontal conveyor 30 were rotated at too great a speed, the windrow of crop material would overshoot the discharge edge 27 and fall flat onto the ground G without inverting. In this respect, it has been found that the maximum rotational speed of the horizontal conveyor 30 in this embodiment should be in the range of 12 to 15 RPM's, with an optimum speed being in the range of 10 to 12 RPM's.

The operation of the windrow turner 10 is best seen in the sequential views of FIGS. 6-9. As seen in the top plan and side elevational views of FIGS. 6a and 6b, the windrow turner 10 is positioned in an operating position such that the pickup 15 engages a windrow of crop material W lying in a first longitudinally extending path 57. Typically, the windrow W in the first path 57 will be generally dried on the top where it is exposed to the sun and air and damp on the bottom adjacent the ground where the circulation of air and access to the sun is somewhat restricted. Furthermore, the ground along the first path 57 will also be damp and, therefore, it would be undesirable to invert the windrow and return it to its first path 57.

Figure 7A:
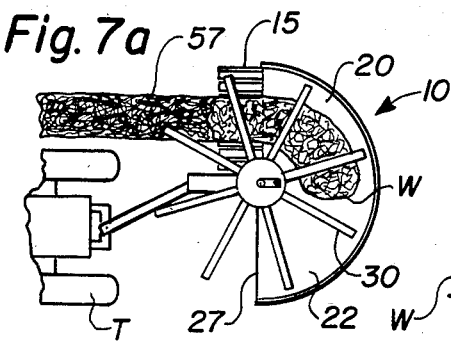
Figure 7B:
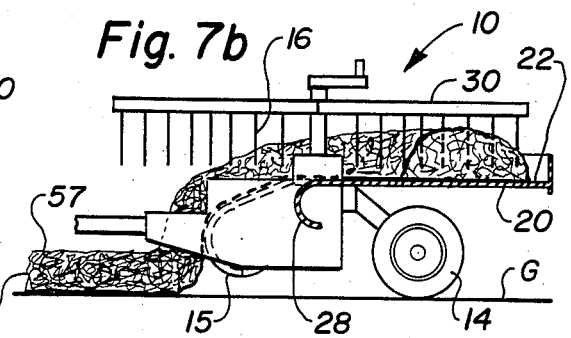

As represented by the schematic views of FIG. 7a and 7b, the windrow W is elevated onto the table 20 by the pickup 15 and subsequently engaged by the horizontal conveyor 30 to begin conveyance thereof around the semi-circular table 20. It has been found that the action of the pickup 15 helps to fluff the windrow 20, because of the combing action of the tines 16 in lifting the windrow W from the ground G. One skilled in the art will readily appreciate that the more the windrow of crop material is fluffed, the better the air can circular therethrough to facilitate the drying of the crop material.

Figure 8A:
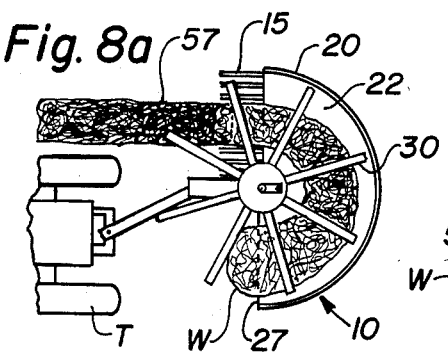
Figure 8B:
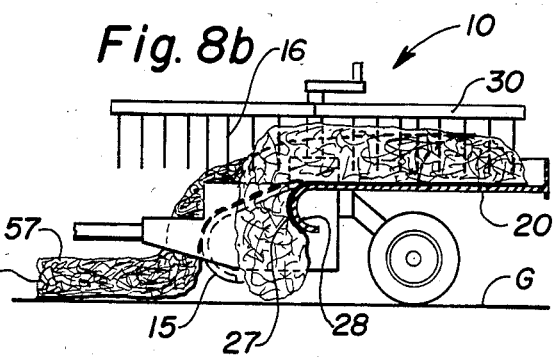

As represented in the schematic views of FIGS. 8a and 8b, the horizontal conveyor 30 conveys the windrow W around the semi-circular table 20 toward the discharge edge 27. One skilled in the art will readily realize that while the windrow W is on the table 20, the orientation of the windrow W is essentially the same as when the windrow W was in the first path 57; namely, the drier crop material is on the top of the windrow W, while the damper material is on the bottom, adjacent the planar surface 22 of the table 20.

Referring now to the views of FIGS. 8a, 8b, 9a and 9b, it can be seen that the horizontal conveyor 30 rotates at a speed sufficiently fast to convey the windrow W around the table 20, yet slow enough to permit the windrow W to roll off the downwardly curved section 28 without imparting enough momentum thereto to overshoot the discharge edge 27. As a result, the windrow W tumbles down over the curved section 28 at the discharge edge 27 and is deposited on the ground G along a second path 59 laterally spaced from the first path 57. Furthermore, a combination of the movement of the windrow W over the discharge edge 27, the engagement of the windrow W with the ground G, and the forward speed of the windrow turner 10 causes an inversion of the windrow W such that the dry side on top of the windrow W, while in the first path 57 and on the table 20, is adjacent the ground G when in the second path 59 and, consequently, the opposing damp side is positioned on top of the windrow W when in the second path 59 to expose it to the drying action of the sun and air. In addition, the tumbling action of the windrow W over the downwardly curved section 28 of the discharge edge 27 causes a further fluffing of the windrow W, such that the combined fluffing action of the pickup 15 and the tumbling of the windrow W over the discharge edge 27 produces a windrow W in the second path 59 that is significantly fluffed to facilitate a circulation of air therethrough than originally found in the first path 57.

Figure 9A:
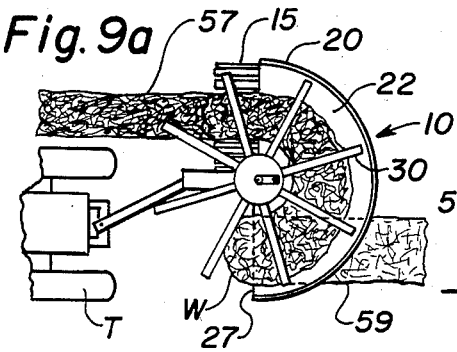
Figure 9B:
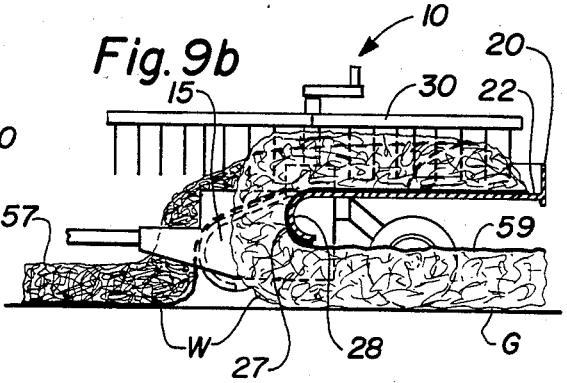

It should be noted that the vertically extending wall 25 around the periphery of the table 20 can assist in the conveying of crop material around the table 20, particularly in heavy crop conditions; however, it has been found that the wall 25 could be at least partially eliminated without significantly affecting the ability of the horizontal conveyor 30 to convey the windrow W around the surface 22 of the table 20. The lack of a means to positively invert the windrow W at the discharge edge 27, such as a curved shield forming a passageway in conjunction with the downwardly curved section 28 through which the windrow W would have to pass, and the gentle handling of the windrow W by the pickup 15 and the horizontal conveyor 30, results in a very gently handled windrow W which becomes inverted and laterally displaced onto drier ground without damaging the crop material and, thereby, decreasing its nutritional value. The positioning of the inverted windrow W in a second path 59 laterally spaced from the first path 57 also facilitates drying because the dry side of the windrow W is not positioned against a wet ground surface from which the dry crop material could gather moisture. It should also be noted that the wheels 14 of the windrow turner 10 are positioned in such a manner, as seen in FIGS. 1 and 9a, that the newly deposited windrow W in the second path 59 is not trampled by any of the machinery, i.e., the windrow turner 10 or the tractor T, to flatten the newly fluffed windrow W.

It will be understood that changes in the details, materials, steps and arrangements of parts which have been described and illustrated to explain the nature of the invention will occur to and may be made by those skilled in the art upon a reading of this disclosure within the principles and scop of the invention. The foregoing description illustrates the preferred embodiment of the invention; however, concept, as based upon the description may be employed in other embodiments without departing from the scope of the invention. Accordingly, the following claims are intended to protect the invention broadly as well as in the specific form shown.

Having thus described the invention, what is claimed is:

1. An apparatus for inverting and laterally displacing a windrow of crop material from a first path on the ground in which the windrow of crop material is oriented with a dry side on top and a damp side adjacent the ground to a laterally spaced second path in which the windrow of crop material is oriented with the damp side on top and the dry side adjacent the ground, comprising:

a mobile frame adapted for movement over the ground at a forward speed of travel;

a platform mounted on said frame and having a surface over which the windrow of crop material can be conveyed, said platform surface terminating at a discharge edge;

pickup means supported from said frame for engagement with said windrow of crop material in said first path, said pickup means being operable to elevate said windrow from the ground to said platform surface;

conveying means operably engageable with said windrow deposited on said platform surface to convey said windrow along said platform surface to said discharge edge, said windrow being oriented on said platform surface with the dry side on top and the damp side adjacent said platform surface, said conveying means being operable to tumble said windrow of crop material over said discharge edge toward the ground;

adjustment means operably associated with said conveying means for vaying the height thereof relative to the surface of said platform; and drive means drivingly connected to said pickup means and said conveying means for operation thereof at a speed to permit said windrow of crop material to be inverted upon contatct with the ground under conditions where said frame is moving at a forward speed of travel to orient said windrow in said second path with the dry side adjacent the ground.

2. The apparatus of claim 1 wherein said conveying means is rotatable with a generally vertically extending drive shaft operably connected to said drive means, said conveying means including a plurality of generally horizontal tine arms radially extending from said drive shaft above said platform, each said tine arm having a plurality of tines depending downwardly therefrom to engage crop material on said platform surface.

3. The apparatus of claim 2 wherein said platform has a semi-circular shape, said discharge edge being positioned transversely opposite said pickup means relative to said conveying means drive shaft, said conveying means being operable to convey said windrow of crop material in an arcuate path rearwardly from said pickup means, then laterally and forwardly to said discharge edge.

4. The apparatus of claim 3 wherein the speed of rotation of said conveying means is limited by said drive means to prevent said conveying means from imparting sufficient momentum to said crop material to cause said crop material to overshoot said discharge edge, the tumbling action of said crop material over said discharge edge effected by said conveying means causing said windrow to fluff such that the windrow in said second path is thicker than the windrow in said first path.

5. The apparatus of claim 4 wherein said drive means is connected to an external source of rotational power and limits the rotational speed of said conveying means to less than 15 revolutions per minute for an input speed of 540 revolutions per minute from said external source of rotational power.

6. The apparatus of claim 4 wherein said tine arms are connected to a mounting plate engaged with said drive shaft for rotation therewith, said adjustment means including a screw mechanism interconnecting said mounting plate and said drive shaft to permit relative vertical movement therebetween.

7. The apparatus of claim 6 wherein said platform has an arcuate outer peripheral edge and an upright wall extending generally perpendicular to said platform surface around said peripheral edge, said upright wall being operable to restrict movement of the crop material on said platform surface over said peripheral edge.

8. The apparatus of claim 6 wherein said mobile frame is at least partially supported by a pair of ground engaging wheels, both said ground engaging wheels being disposed transversely of said conveying means drive shaft to one side thereof so that said ground engaging wheels do not engage the windrow when placed in said second path.

9. The apparatus of claim 8 wherein said ground engaging wheels are positioned behind said pickup means such that said wheels do not engage the windrow before being picked up in said first path.

10. The apparatus of claim 6 wherein said adjustment means is disposed substantially at the center of said conveying means.

* * * * *